United States Patent [19]

Potocjnak

[11] Patent Number: 4,838,749
[45] Date of Patent: Jun. 13, 1989

[54] STORAGE ASSEMBLY

[75] Inventor: Tomislav Potocjnak, Lauffen, Fed. Rep. of Germany

[73] Assignee: Tepora Transportsysteme Entwicklungs-GmbH, Lauffen, Fed. Rep. of Germany

[21] Appl. No.: 123,384

[22] Filed: Nov. 20, 1987

[30] Foreign Application Priority Data

Nov. 20, 1986 [DE] Fed. Rep. of Germany ........ 3639649

[51] Int. Cl.$^4$ .......................... B65G 1/04; B66F 9/14
[52] U.S. Cl. .................................. 414/277; 414/282; 414/745.7; 414/785
[58] Field of Search ............................ 414/277–282, 414/268, 269, 659–664, 785, 83, 745, 286, 745.7

[56] References Cited

U.S. PATENT DOCUMENTS

| 1,344,617 | 6/1920 | Burgess | 414/277 X |
| 3,175,722 | 3/1965 | Paulssen | 414/277 |
| 3,526,330 | 9/1970 | Armington et al. | 414/785 X |
| 4,005,786 | 2/1977 | Adelson et al. | 414/281 |
| 4,252,486 | 2/1981 | Soligno | 414/277 X |
| 4,268,207 | 5/1981 | Pipes | 414/281 X |
| 4,572,719 | 2/1986 | Theobald | 414/277 |
| 4,715,766 | 12/1987 | Gebhardt | 414/278 X |

FOREIGN PATENT DOCUMENTS

| 3003628 | 8/1981 | Fed. Rep. of Germany | 414/277 |
| 212302 | 12/1984 | Japan | 414/281 |
| 569504 | 9/1977 | U.S.S.R. | 414/277 |
| 625975 | 9/1978 | U.S.S.R. | 414/281 |
| 796087 | 1/1981 | U.S.S.R. | 414/279 |

Primary Examiner—David A. Bucci
Attorney, Agent, or Firm—Kenyon & Kenyon

[57] ABSTRACT

A storage assembly or facility comprises a shelving block having compartments, a lifting jack and a tie bar. The lifting jack is operatively connected to the tie bar for vertically shifting the tie bar in front of a vertical array of storage compartments. The tie bar is provided with a plurality of telescoping receiver members for inserting into the compartments and subsequently removing therefrom items to be stored. For storing goods of different sizes, the compartments have a modular length equal to the common width of a plurality of columns of the compartment array.

17 Claims, 5 Drawing Sheets

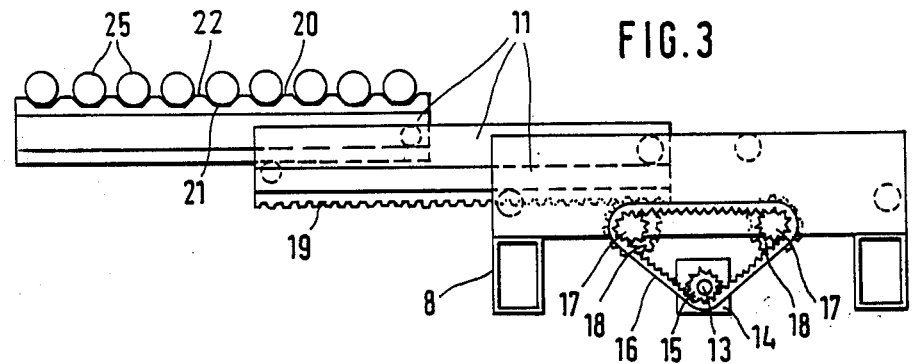
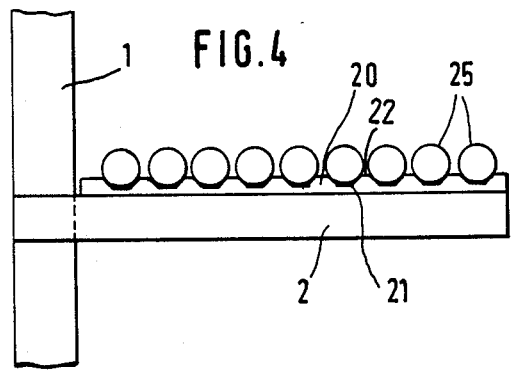
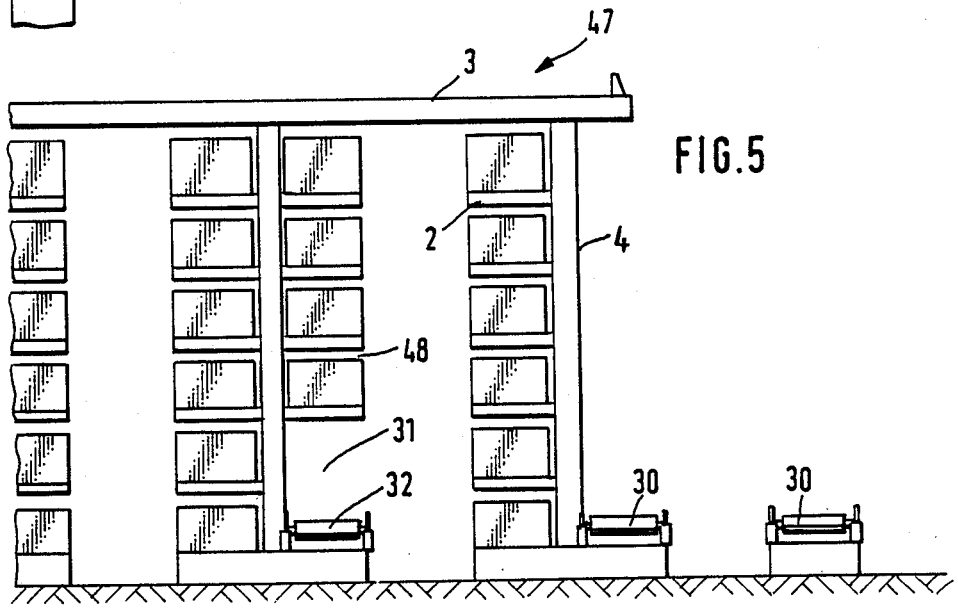

FIG. 7

STORAGE ASSEMBLY

BACKGROUND OF THE INVENTION

This invention relates to a storage assembly for temporarily storing objects or items of different sizes and shapes.

Various types of high shelving systems are available for storing articles of different shapes and sizes. Such storage systems are most often adapted to handle modular ware containers such as pallets, skeleton containers, pole cassettes, sheet pallets and the like. Even with respect to the storage of mass produced articles such as automobile replacement parts, many articles cannot be stored in the same shelf or moved into and out of storage by the same operator device, owing to the differences in the dimensions of the articles. Gasoline pumps, for example, can be stored in skeleton containers, while the roofs of delivery trucks, due to their large dimension, must be kept in a special storage location. It is frequently necessary to prepare three or more storage systems for small items, sheets and long items such as poles, respectively. Such multiplication of storage systems, especially in medium sized plants, can lead to relatively high production costs, particularly if each of the particular storage items involves relatively small quantities.

An object of the present invention is to provide a storage assembly or facility capable of easily holding articles or items of different sizes and shapes.

A more particular object of the present invention is to provide such a storage assembly or facility capable of storing small parts, pallets, pole boxes, sheet pallets, sheets and long items such as rods and pipes.

Another particular object of the present invention is to provide such a storage assembly wherein various items can be moved into and out of storage simply and without elaborate and expensive restructuring of the storage assembly.

SUMMARY OF THE INVENTION

A storage assembly in accordance with the present invention comprises a shelving system defining a multiplicity of storage compartments disposed in at least one vertically oriented planar array for receiving and supporting items to stored. A deposition and removal device for depositing into the compartments and subsequently removing therefrom selected items to be stored includes an elongate substantially horizontally extending tie bar shiftable in a vertical direction in juxtaposition to the planar array. The disposition and removal device further includes a lifting jack operatively connected to the tie bar for shifting the tie bar in the vertical direction. The planar array of compartments is organized into a plurality of rows and a plurality of columns, wherein the columns have a common width in a longitudinal direction parallel to the tie bar. The smallest of the compartments occupies only one of the columns and has a length parallel to the tie bar equal to the common width of the columns. Moreover, each of the compartments has a length parallel to the tie bar equal to a multiple of the common width of the columns. The deposition and removal device also includes on the tie bar a plurality of pairs of receiver members, each of the pairs being juxtaposed to and associated with a respective one of the columns of the planar storage array. The receiver members are movable in a horizontal direction transversely with respect to the tie bar and the planar array.

Preferably, each of the receiver members forms a portion of a respective telescoping jib device, while the shelving system comprises a plurality of vertically oriented planar arrays of storage compartments, the planar arrays being parallel to one another and the lifting jack being translatable in the horizontal direction transversely with respect to the tie bar and the planar arrays.

Pursuant to another feature of the present invention, the shelving system includes a plurality of stands and a plurality of horizontal extending carrying arms connected to the stands. Adjacent stands are spaced a distance from one another in the longitudinal direction at least as great as the length of the smallest compartment.

The tie bar is advantageously fastened at opposite ends to two transverse carrier bars each provided at opposite ends with rollers. At least two vertically extending tracks are provided at each end of the tie bar, preferably outside of the planar array or arrays, the rollers engaging the tracks during motion of the tie bar.

In accordance with further, more particular features of the present invention, each receiver member is shiftable outwardly from the tie bar alternately on opposite sides thereof, the deposition and removal device further including a drive operatively connected to the receiver members for shifting a selectable number of the receiver members simultaneously. The drive may include a drive motor, a shaft rotatably mounted to the tie bar and extending longitudinally therealong, and switchable coupling elements operatively engageable with the shaft and respective receiver members for selectably coupling the shaft to the receiver members. More particularly, each of the receiver members may form a portion of a respective telescoping jib device including a rack and a pinion, the pinion being drivable by the shaft via a flexible endless drive element.

Pursuant to a favored embodiment of the invention, a transfer roller bed is disposed on the tie bar for outwardly transferring items from the storage assembly in the longitudinal direction of the tie bar upon removal of such items from a storage compartment by the receiver members. The roller bed is preferably shiftably disposed on the tie bar for motion in the vertical direction. In addition, a drive motor is operatively connected to the rollers of the roller bed for rotatably driving those rollers. The roller bed advantageously comprises a plurality of roller frames each disposed between adjacent receiver members, a lifting means being provided for raising the frames simultaneously.

BRIEF DESCRIPTION OF THE DRAWING

FIG. 3 is a schematic transverse or end view of the tie bar of FIGS. 1 and 2, showing a telescoping jib in detail.

FIG. 4 is a side elevational view of a particular embodiment of a carrying arm in the shelving block of FIGS. 1 and 2.

FIG. 5 is a schematic partial side elevational view of another embodiment of the storage assembly in accordance with the present invention, showing an end view of an integrated delivery and reception compartment.

FIG. 7 is a schematic side elevational view of a preferred embodiment of a tie bar usable in the storage assembly of FIGS. 1 and 2, showing a roller bed for the transfer of goods laterally into and out of the storage assembly.

DETAILED DESCRIPTION

Figure 1:
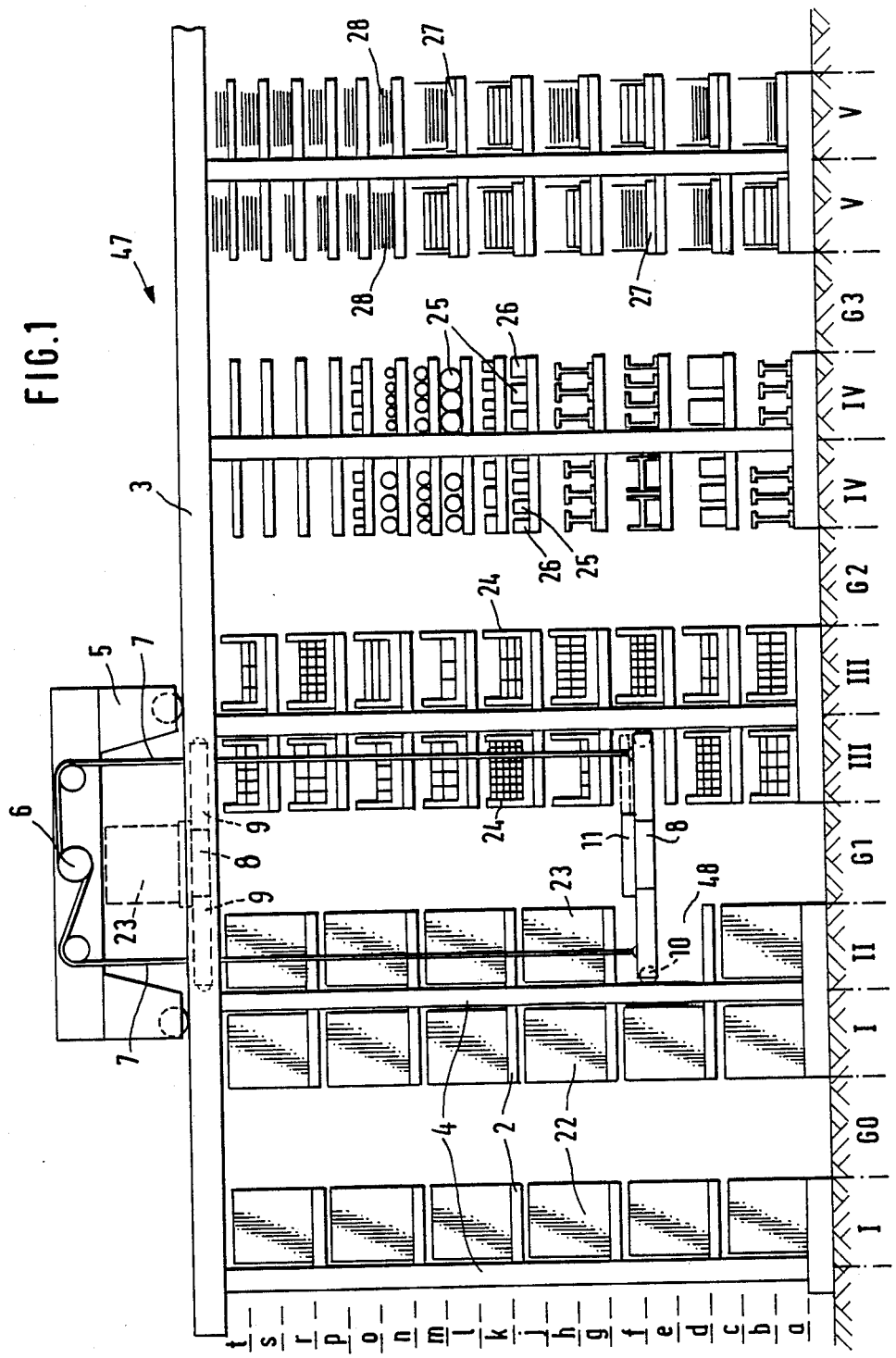
FIG. 1 is a schematic side elevational view of a storage assembly or facility in accordance with the present invention, showing a shelving block, a tie bar and telescoping jibs with receiver elements.
Figure 2:
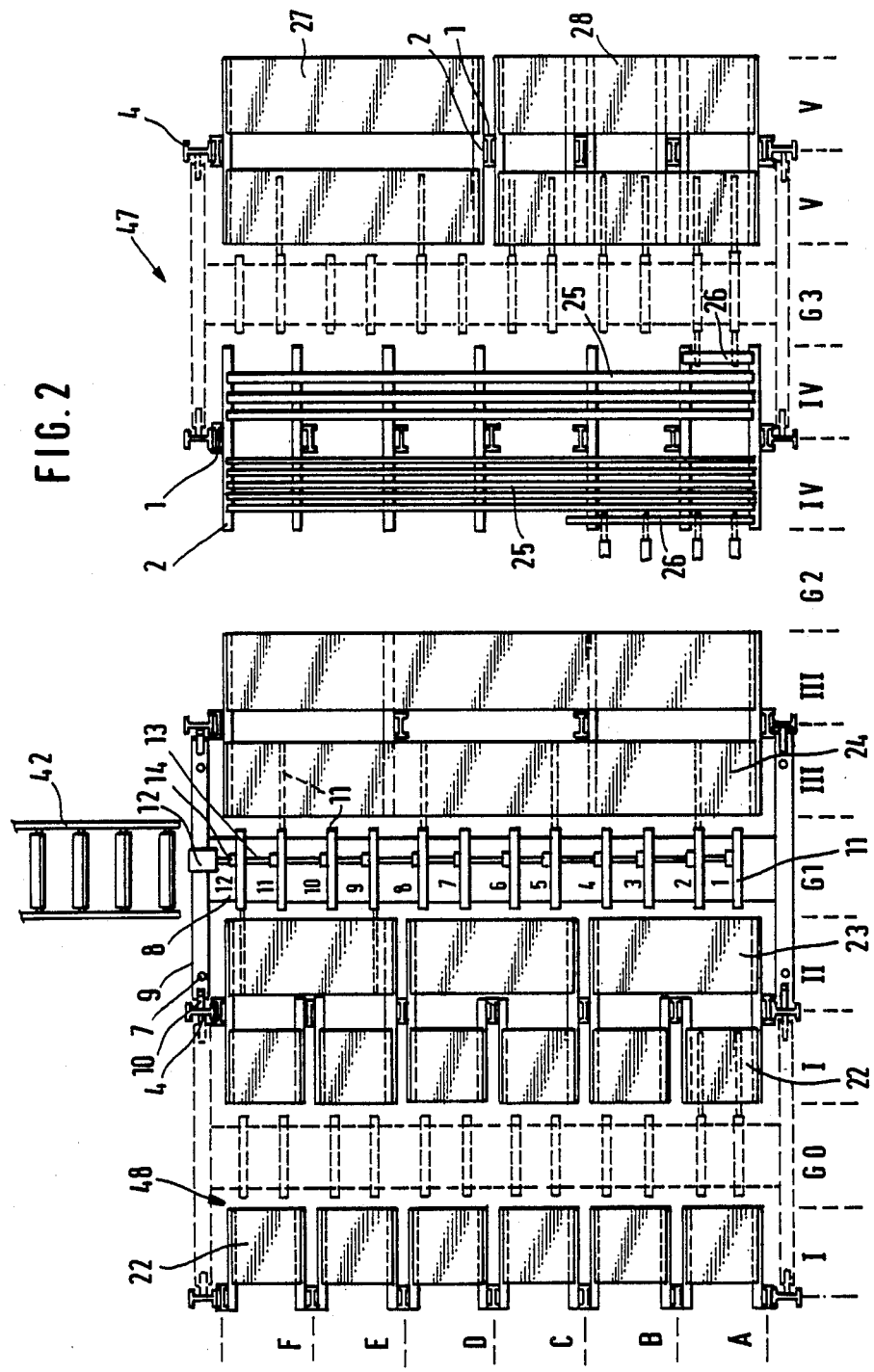
FIG. 2 is a schematic top view of the storage assembly of FIG. 1.

As illustrated in FIGS. 1 and 2, a storage assembly or arrangement according to the present invention comprises a block of shelving 47 defining a multiplicity of storage compartments 48. Shelving block 47 comprises vertical stands or posts 1 provided with horizontal braced carrier arms 2. Compartments 48 are arranged in planar arrays designated with Roman numerals I-V in FIGS. 1 and 2. As indicated on the left-hand side of FIG. 2, each planar array of compartments 48 is organized into a plurality of columns A, B, C, D, E and F. The columns A-F have a common width as measured in a longitudinal direction defined by an elongate tie bar 8. A smallest compartment 48 (left-most planar array I in FIG. 2) occupies one of the columns A-F and has a length parallel to tie bar 8 equal to the common width of columns A-F. The length of storage compartments 48 is selected so that the longest item to be stored or, alternatively, the longest pallet to be used in the storage facility, is a multiple of the length of the smallest storage compartment 48 or, equivalently, a multiple of the common width of columns A-F.

As indicated along the bottom margins of FIGS. 1 and 2, the planar compartment arrays I-V are arranged in pairs, the members of each pair being separated by a respective shelving passage G0, G1, G2 and G3. As shown in FIG. 1, each planar array I-V is organized into a plurality of rows, each row having a height which is a multiple of the height of the lowest storage compartment above the ground level. The rows in planar compartment arrays I hold respective groups of storage pallets or cages 22 and have a height equal to three units. Along the left-hand margin of FIG. 1 is indicated a height division from a to t.

A pair of horizontally oriented tracks or rails 3 is disposed at the upper end of shelving block 47. A lifting jack 5 is supported by tracks 3 for motion in a horizontal direction perpendicular to planar compartment arrays I-V. Lifting jack 5 carries a hoist gear 6 on which a rope or cable 7 is alternately wound and unwound for raising and lowering tie bar 8. The tie bar is fastened to the ends of rope or cable 7 and is movable vertically in shelving passages G0, G1, G2 and G3.

As illustrated in FIGS. 1 and 2, cables 7 are attached to transverse carrier members or bars 9 attached to tie bar 8 at opposite ends thereof. During motion of tie bar 8 vertically in a shelving passage G0, G1, G2 or G3, rollers 10 rotatably mounted to carrier member 9 at opposite ends thereof rollably engage vertically oriented tracks or rails 4 disposed in pairs at the opposite ends of tie bar 8 and planar arrays I-V.

Tie bar 8 is provided with a multiplicity of pairs of receiver members 11 formed as telescoping jibs (FIG. 3). Each pair of receiver members or telescoping jibs 11 is juxtaposed to and associated with a respective column A-F of the storage assembly's planar compartment arrays. Jibs 11 are telescopingly movable in a horizontal direction transversely with respect to tie bar 8 and planar arrays I-V. An uppermost member 11' of each telescoping jib device 11 (FIG. 3) is movable alternately into and out of storage compartments 48.

Preferably, telescoping jibs 11 are extendable outwardly away from tie bar 8 alternately on opposite sides thereof for accessing the compartments in the planar arrays on opposite sides of a shelving passage G0, G1, G2 or G3. All telescoping jibs 11 are driven by a single geared engine 12 via a synchro-system. As depicted in FIG. 2, each telescoping jib 11 is operatively connected to engine 12 via a rotatable shaft 13 mounted to tie bar 8 and extending longitudinally therealong. As best seen in FIG. 3, each telescoping jib 11 is in turn operatively connectable to rotary shaft 13 via a coupling 14, a gear 15, an endless belt 16, and further gears or pulleys 17. Each gear or pulley 17 is rotatably fixed to a respective pinion or gear wheel 18 in turn having teeth meshable with the teeth of a linear rack 19. As indicated in FIG. 3, rack 19 engages one or both pinions 18 depending on the longitudinal position of rack 19 or, concomitantly, the degree of extension of the respective telescoping jib 11. Preferably, coupling 14 takes the form of a remote-controlled clutch or a magnetic coupling for optionally connecting a respective telescoping jib 11 to rotary shaft 13. Accordingly, depending on how many and which of the plurality of couplings 14 are engaged, a selectable number of the telescoping jibs are simultaneously actuated for depositing into a respective compartment 48 or removing therefrom an article or item.

A storage unit which has a smallest cross-sectional area can be standard pallet or cage 22 wherein the area is limited by the common width of columns A-F and the breadth of planar arrays I-V. The height of a storage compartment 48 can vary from a smallest height unit, exemplarily a (FIG. 1). Between the members of each pair of adjacent storage compartments 48 is disposed a respective shelving stand 1.

A storage compartment having a next-larger length, for example, the storage compartments in planar array II, has a length equal to approximately twice the common width of columns A-F. Such a next-larger storage compartment may hold pallets 23. The number of stands 1 equipped with carrying arms 2 for forming double length storage compartments as in planar array II in FIG. 2 is necessarily smaller than the number required for planar array I.

For storing long items, a cassette 24 is advantageous. As shown in FIG. 2, cassette 24 occupies a storage compartment in one of planar arrays III, that storage compartment extending across all six columns A-F. Inasmuch as cassette 24 has some inherent rigidity, only every second or third stand is necessarily equipped with carrier arms 2.

Pursuant to another possibility in accordance with the present invention, long items such as individual rods 25 may be stored in a compartment of a planar array IV, that compartment extending across all six columns A-F. A shorter elongate piece 26 can also be stored in a compartment of one of planar arrays IV, wherein piece 26 has a length at least as great as the common width of columns A-F.

To store long individual rods 25, it is advisable that carrier arms 2 (FIG. 4) and uppermost members 11' of telescoping jibs 11 have a supporting surface equipped with teeth 22 which define tooth gaps 21 for receiving individual rods 25 and preventing the rods from rolling off the carrier arm or the telescoping jib member.

Storage compartments 48 may have different heights, depending exemplarily on whether small rods or large square tubing is being stored (see FIG. 1).

For storing sheets, a sheet pallet 27 is advantageous. As shown in FIG. 2, such a pallet may exemplarily extend across three column widths D-F and have a two-unit height (FIG. 1). Alternatively, sheets 28 (FIGS. 1 and 2) can be stored without a pallet. In such a case, shelving stands 1 provided with carrier arms 2 in the respective planar array (V) are advantageously spaced from one another by the common width of columns A-F in order to minimize the bending of sheets 28.

Figure 6:
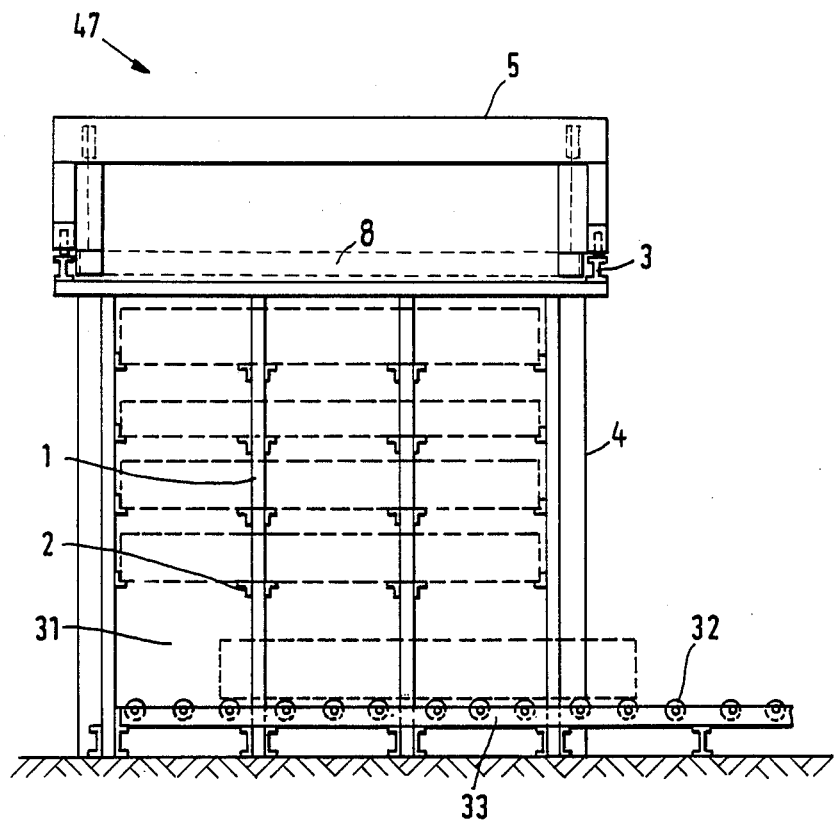
FIG. 6 is an end elevational view of the storage assembly of FIG. 5, showing a built-in transverse roller bed in side elevational view.

Items stored in the storage assembly can be transferred out of the assembly at a transfer station located outside of shelving block 47, as illustrated at 30 in FIG. 5. Upon the removal of an item from a storage compartment 48 and the disposition of that item on tie bar 8, lifting jack 5 raises the tie bar to an uppermost position and then moves along tracks 3 to a position over an output table/roller bed 30 located before or behind shelving block 47. Alternatively, as shown in FIG. 5, shelving block 47 may be equipped with an output compartment 31 in turn provided with a transverse roller bed 32. The item to be moved out of the storage assembly is deposited onto the roller bed 32 in output compartment 31 by tie bar 8 and telescoping jibs 11. Upon deposition of the output article or item onto roller bed 32, the item is shifted or rolled laterally out of shelving block 47. The latter alternative for transferring goods into and out of the storage assembly, however, results in a limitation of the flexibility thereof, particularly if the goods in question are long items, inasmuch as compartment 31 must be preselected in advance and located in the lowest row of a planar compartment array. Otherwise, if roller bed 32 were located in a higher row, the roller bed would have to be exceptionally sturdily dimensioned (see FIG. 6).

Figure 7:
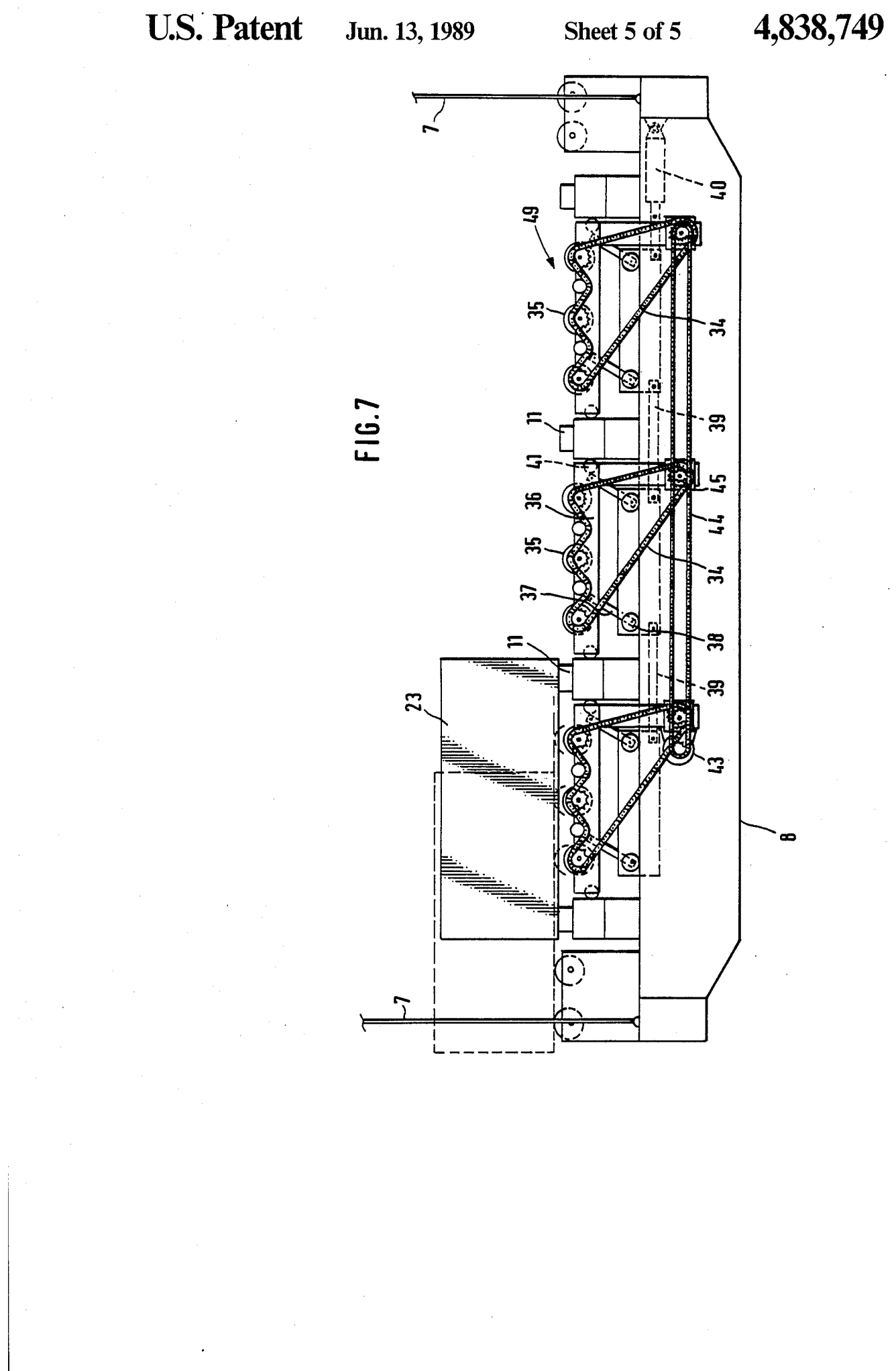

Pursuant to the present invention, a roller bed 49 is preferably disposed on tie bar 8, as shown in FIG. 7. Transport rollers 35 of roller bed 49 are rotatably mounted to respective frames 36 in turn disposed between adjacent pairs of telescoping jibs 11. Transport rollers 35 associated with a particular frame 36 are rotatably driven by a respective endless drive chain 34 in turn driven by a motor 43 via another endless chain 44 and an electrocoupling 45.

Each frame 36 is movable in a vertical direction by an assembly including a respective pair of levers 37 and hoist rollers 38. The hoist roller and lever assembly for each roller frame 36 is connected to the hoist roller and lever assemblies of the other roller frames 36 via tie rods 39 so that, upon the actuation of a hydraulic cylinder or eccentric drive 40, frames 36 move upwardly. Frames 36 are braced via rollers 41 on stops (not shown) fastened to telescoping jibs 11.

To remove an item, e.g., pallet 22, from a shelf or compartment of shelving block 47, tie bar 8 is positioned slightly below the pallet and at least two telescoping jibs 11 are extended laterally into the compartment. Tie bar 8 is then lifted and telescoping jib retracted back toward the center of tie bar 8. Subsequently, tie bar 8 is moved by lifting jack 5 to an output station in or about shelving block 47. Upon the actuation of hydraulic cylinder or eccentric drive 40, tie rods 39 are tightened and roller frames 36 are lifted. Electrocouplings 45 and motor 43 are then energized to rotate rollers 33 and discharge the pallet from the tie bar laterally onto a roll-off roller bed 42.

A storage assembly or arrangement according to the present invention offers a number of advantages. In conventional shelving assemblies, a shelving device reaches only one position in the shelving arrangement. In such conventional assemblies, the shelving device must move each pallet individually when removing large quantities of identical goods. In contrast, in a storage assembly according to the present invention, up to five or six pallets can be removed simultaneously. The storage assembly according to the invention, therefore, favors storing mass produced goods with a low system number.

Elongate tie bar 8 equipped with transverse roller bed 49 enables, during one trip, the formation of an entire commission consisting exemplarily of five or six pallets of different goods. In this way, travel times can be reduced and the receiving and delivery area can be relieved.

In conventional shelving installations, the removal of stored goods and the input of stock takes place at the end of a shelving passage. Pursuant to the invention, goods can be delivered laterally and accepted at essentially any site.

With a tie bar in accordance with the present invention, it is possible to form a commission of several pallets or products on the tie bar and to deliver them completely to assembly work stations next to the shelving, whereby the work stations can be supplied with all required parts at once.

In a storage assembly according to the present invention, different materials such as rods, plates and small parts can be supplied over one and the same roller bed at any site or location near the shelving block. It is also possible to transporting semi-finished products back into the storage assembly or arrangement in order to store them temporarily.

It is to be noted that tie bar 8 can be raised and lowered by alternative hoisting systems such as scissor arrangements, telescoping devices and outside guided systems.

What is claimed is:

1. A storage assembly comprising:
   shelving means defining a multiplicity of storage compartments disposed in at least one vertically oriented planar array for receiving and supporting items to be stored; and
   deposition and removal means for depositing into said compartments and subsequently removing therefrom selected items to be stored, said deposition and removal means including an elongate substantially horizontally extending tie bar shiftable in a vertical direction in juxtaposition to said planar array, said deposition and removal means further including a lifting jack operatively connected to said tie bar for shifting same in said vertical direction,
   said planar array being organized into a plurality of rows and a plurality of columns, said columns having a common width in a longitudinal direction parallel to said tie bar, a smallest of said compartments occupying only one of said columns and having a length parallel to said tie bar equal to said common width, each of said compartments having a length parallel to said tie bar equal to a multiple of said common width, said deposition and removal means also including on said tie bar a plurality of pairs of receiver members, each of said pairs being juxtaposed to and associated with a respective one of said columns, said receiver members having drive means operatively connected thereto, said drive means being capable of shifting a selectable number of said receiver members simultaneously, said drive means including a drive motor, a shaft rotatably mounted to said tie bar and extending longitudinally therealong, and switchable coupling means operatively engageable with said shaft and said receiver members for selectively coupling said shaft to said receiver members.

2. A storage assembly as set forth in claim 1 wherein each of said receiver members forms a portion of a respective telescoping jib device.

3. A storage assembly as set forth in claim 1 wherein said shelving means comprises a plurality of vertically oriented planar arrays of storage compartments, said planar arrays being parallel to one another and said lifting jack being translatable in said horizontal direction transversely with respect to said planar arrays by means of a horizontal drive means. wherein each of said receiver members forms a portion of a respective telescoping jib device.

4. A storage assembly as set forth in claim 1 wherein said shelving means includes a plurality of stands and a plurality of horizontally extending carrying arms connected to said stands.

5. A storage assembly as set forth in claim 4 wherein adjacent ones of said stands are spaced a distance from one another in said longitudinal direction parallel to said tie bar, said distance being at least as great as the length of the smallest of said compartments.

6. A storage assembly as set forth in claim 1 wherein said tie bar is fastened at opposite ends to two transverse carrier bars each provided at opposite ends with rollers, further comprising at least two vertically extending tracks at each end of said tie bar, said rollers engaging said tracks during motion of said tie bar.

7. A storage assembly as set forth in claim 1 wherein each of the receiver members is shiftable outwardly away from said tie bar alternatively on opposite sides thereof.

8. A storage assembly as set forth in claim 1 wherein each of said receiver members forms a portion of a respective telescoping jib device, said telescoping jib device including a rack and a pinion, said pinion being drivable by said shaft via a flexible endless drive element.

9. A storage assembly as set forth in claim 1 wherein at least two of said receiver members each have a supporting surface equipped with teeth defining a plurality of tooth gaps for receiving rod-shaped items.

10. A storage assembly as set forth in claim 1, further comprising an output compartment provided with transfer means including a transverse roller bed for outwardly transferring items from the storage assembly upon deposition of such items in said output compartment by said tie bar.

11. A storage assembly as set forth in claim 1, further comprising transfer means including a roller bed disposed on said tie bar for outwardly transferring items from the storage assembly in said longitudinal direction upon removal of such items from one of said compartments by said receiver members.

12. A storage assembly as set forth in claim 11 wherein said roller bed is shiftably disposed on said tie bar for motion in the vertical direction.

13. A storage assembly as set forth in claim 12 wherein said transfer means includes a motor drive operatively connected to rollers of said roller bed for rotatably driving the rollers of said roller bed.

14. A storage assembly as set forth in claim 13 wherein said roller bed comprises a plurality of roller frames each disposed between adjacent ones of said receiver members, said transfer means further including lifting means for raising said frames simultaneously.

15. A storage assembly as set forth in claim 14 wherein said transfer means further includes electrocoupling elements and a flexible endless drive element for transmitting rotary motion selectively to rollers of said frames.

16. A storage assembly as set forth in claim 15 wherein said lifting means includes a plurality of lever bars each connected to a respective one of said frames.

17. A storage assembly as set forth in claim 16 wherein each of said lever bars is provided with a drive head in the form of a hydraulic cylinder.

* * * * *